June 30, 1959     F. H. HAGNER     2,892,268
MECHANICAL UNIVERSE INSTRUMENT
Filed May 21, 1958     2 Sheets-Sheet 1
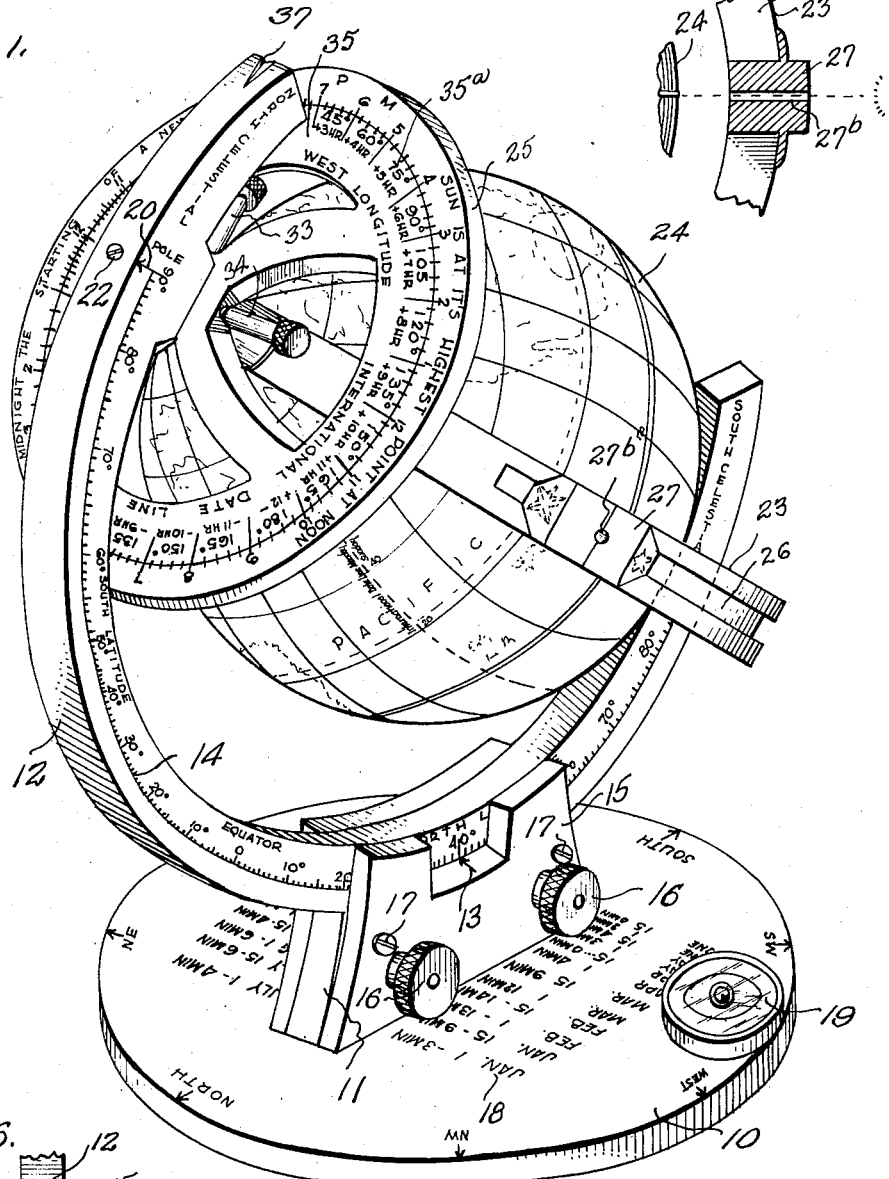
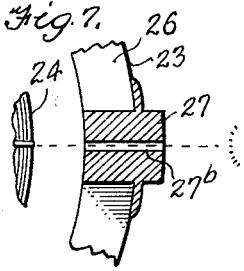
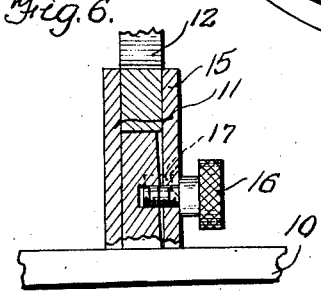
INVENTOR
FREDERICK H. HAGNER
BY
HIS ATTORNEY June 30, 1959 — F. H. HAGNER — 2,892,268
MECHANICAL UNIVERSE INSTRUMENT
Filed May 21, 1958 — 2 Sheets-Sheet 2
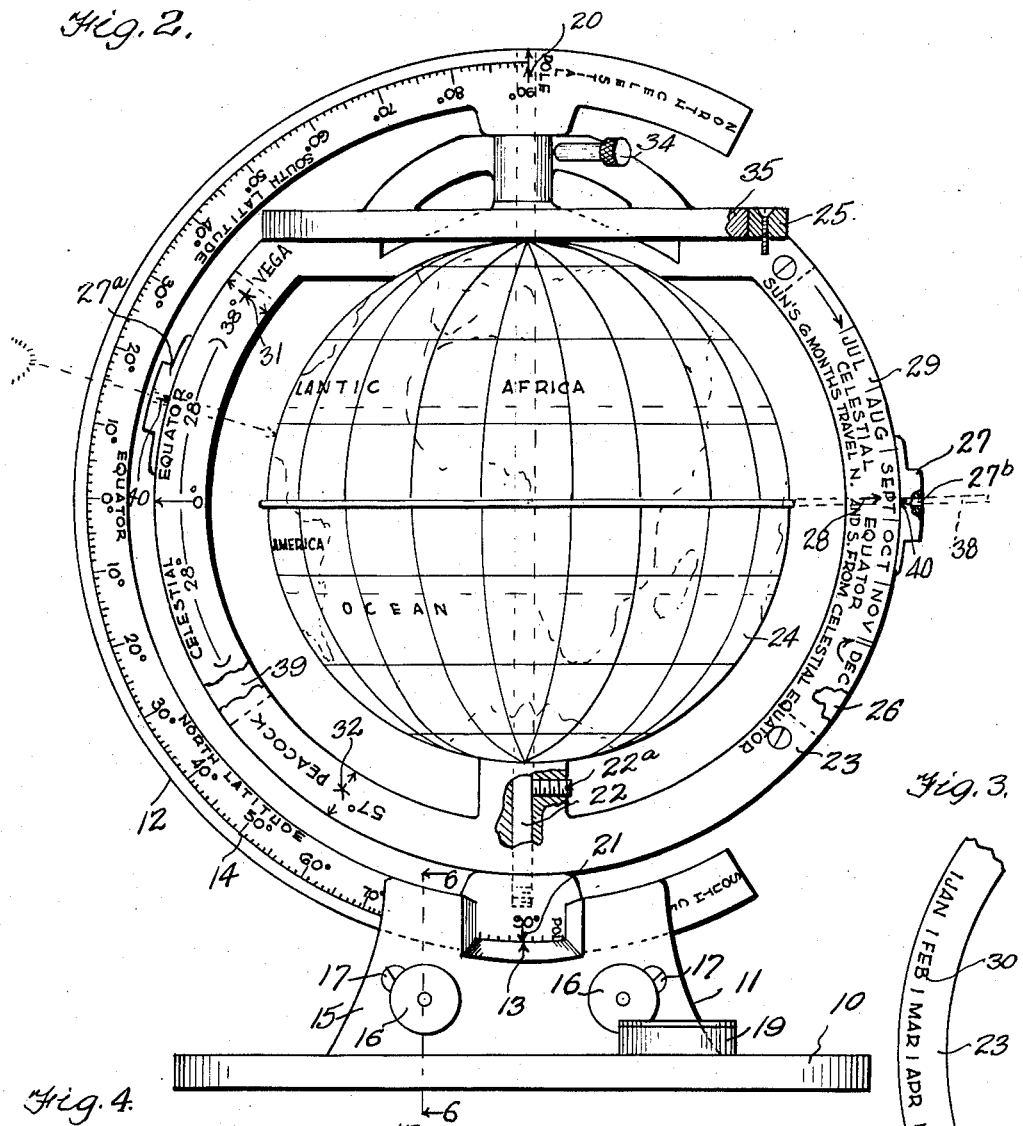
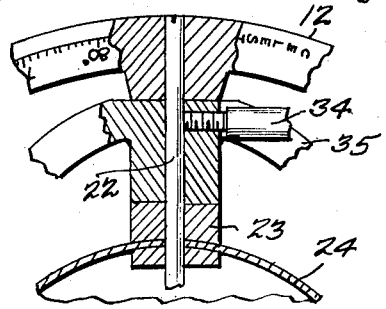
INVENTOR
FREDERICK H. HAGNER
BY
HIS ATTORNEY

United States Patent Office

2,892,268
Patented June 30, 1959

2,892,268

MECHANICAL UNIVERSE INSTRUMENT

Frederick H. Hagner, San Antonio, Tex.

Application May 21, 1958, Serial No. 736,721

2 Claims. (Cl. 35—47)

This invention relates to an instrument which I have named a mechanical universe, and which instrument is to be used as an aid in the teaching of geography and astronomy.

One important object of the present invention is the production of a demonstration instrument or device having all stationary and moving parts necessary to reproduce or simulate the motions of selected celestial bodies as these bodies will appear in the sky, for any given latitude, on the earth, at any given time.

Another object of this invention is the production of a simple and efficient device, which when properly set will match the position of the sun, moon, or stars, as they appear at any given time, or at any geographic location, and in this manner a student may see the actual reproduction of a selected problem, and may thereby learn by seeing and doing, through the manipulation of the various moving parts of the instrument.

Other objects and advantages of the present invention will appear throughout the following specification and claims.

In the drawings:

Figure 1 is a perspective view of the demonstration instrument;

Figure 2 is a side elevational view thereof;

Figure 3 is a fragmentary view of the reverse side of the declination arc, showing the notations of the months from January through June;

Figure 4 is a vertical fragmentary sectional view showing the manner in which the upper portion of the instrument is journaled on the supporting shaft;

Figure 5 is a perspective view of the demonstration pin which is adapted to be used with the sighting slide;

Figure 6 is a vertical sectional view taken on line 6—6 of Figure 2;

Figure 7 is a fragmentary vertical sectional view of the sighting slide mounted on the declination arc, and showing a portion of the world globe.

By referring to the drawings in detail, it will be seen that 10 designates the base of the demonstration instrument or device, which carries an upstanding cradle 11 which serves as a support for the latitude arc 12. This arc 12 is slidably mounted in the cradle 11 and is locked in a selected position, when the selected latitude on the latitude scale 14 registers with the index 13 of the cradle 11. The cradle 11 is provided upon one side thereof, with a clamping jaw 15 which is adapted to be clamped into engagement with the latitude arc 12 through the medium of the thumb screws 16. Retaining screws 17 hold the clamping jaw 15 against displacement from the cradle 11. The base 10 carries upon its upper face a scale chart 18 giving the variance of the sun (fast and slow) relative to the time of day registering upon the watch of an observer. The base 10 is also marked, as shown in Figure 1, with the cardinal points of the compass (N—S—E—W—NE—NW—SE—SW). A level indicating means 19 also is carried by the base 10.

The scale 14 of the latitude arc 12 is marked 0° Equator in the center, and 90° of latitude, North Latitude, to one side of the 0° Equator mark and 90° of latitude, South Latitude, at the opposite side of the central 0° Equator mark. Arrows 20 and 21 are located on the scale 14 near the respective ends of the latitude arc 12 and indicate the north and south celestial poles, respectively, and are in line with the central supporting shaft 22. This shaft 22 extends into the opposite ends of the arc 12 near the terminal thereof, as shown in Figure 1, and constitutes a journal for the declination arc 23, the globe 24, and the time zone and longitude ring 25, all of which parts revolve on the shaft 22. The shaft 22 is locked against rotation by a set screw 22a.

The declination arc 23 carries the sun-time ring 25 at the top thereof, and may be fixed thereto in any conventional manner within the scope of the invention. The declination arc 23 constitutes a 360° ring, approximately one-half of which is provided with a circumferential slot 26 in which slot a sighting slide 27 is slidably mounted. This slide 27 rides in the slot 26 and upon the outer face of the declination arc 23. The arc 23 is provided with an arrow 28 pointing outwardly, indicating the position of the celestial equator in space. On one side of the arc 23 is a scale 29 representing the position of the sun from the celestial equator on the first day of each month for six months, July through December, and on the opposite side of the arc 23 is a scale 30, representing the position of the sun from the celestial equator on the first day of each month for six months, January through June.

The arc 23 is also marked and slotted, as indicated in Figure 2, with the 28° movement of the moon either side of the celestial equator every 29½ days. Stars 31 and 32, with their names and arrows pointing inwardly and outwardly, are indicated upon the arc 23. The arrows pointing out into space indicate the position of the star in the celestial sphere, and the arrows pointing inwardly point to the globe 24 and indicate the latitude on the globe 24, the earth's surface, where that star will pass directly overhead once every 24 hours or every complete rotation of the earth. A set screw 33 is carried by the ring 25 to lock the same on the shaft 22 at a selected position.

The longitude and time zone ring 35 is rotatable on shaft 22, and may be locked on the shaft 22 in a selected position by means of a set screw 34, or the set screw 33 whichever may be the most conveniently reached. This ring 35 is provided with a scale 35a marked to indicate 180° of east longitude and 180° west longitude. 0° longitude indicates Greenwich meridian and the 180° longitude being the international date line, the beginning of a new day. The twenty-four time zones of the world are marked with the longitude in the center of the time zones. A sighting groove or slot 37 is formed at the end of the arc 12 to align the selected longitude for making demonstrations. The world globe 24 is mounted within the arc 23, as shown in Figures 1 and 2.

The ring 25 which may be referred to as the sun-time ring, is marked with 12 hours of a.m. time, and 12 hours of p.m. time, as shown in Figure 1. This ring 25 carries the notation reading "Sun is at its highest point at noon," near one edge thereof, and diametrically opposite it carries the notation reading "Midnight the starting of a new day." The ring 25 is marked to indicate noon and 12 midnight, the longitude on the earth where a new day is beginning. This ring 25 is attached or fixed to the arc 23, as shown in Figure 2.

By means of the movable parts, the instrument will indicate time in all zones for any desired setting of longitude to the sighting slot 37 in arc 12. With the sighting slide 27 set for the proper date, the latitude set for the place of observation, and when the base is level, and by moving the declination arc 23 and the base 10 until a circular sun spot is cast through the aperture 27a of the sighting slide 27 on the world globe 24, an observer may then read the sun time on the face of the ring 25.

By moving the world globe 24 so that the longitude of the place of observation is in alignment with the setting on the scale of the ring 35 the observer will see the sun spot cast on the world globe at the point where the sun is directly overhead at that instant of time. The north arrow marked on the base 10 will be pointing to true north, and the arrow on 90° north latitude will be pointing to the true celestial north in the sky (space).

The slides 27 and 27ª are frictionally or otherwise fitted in the slots 26 and 39, and are to be adjusted to selected positions, and held in these positions until they are again moved by an operator. The apertures 27ᵇ are adapted to facilitate the passage of the sun's rays therethrough when the instrument is used out of doors when the sun is shining, or when the moon is sufficiently bright so that a spot of light may be cast on the globe 24 at a selected location. When the instrument is used indoors, removable pins such as the pin 38 may be extended through the apertures 27ᵇ to simulate a ray of light from a selected celestial body passing through the sighting slide and to indicate the location of the simulated spot or ray of light as it would be cast at a selected location on the globe 24.

A slot 39, similar to the slot 26, is formed in the arc 23 diametrically opposite the slot 26. Each sighting slide 27 and 27ᵇ is provided with a suitable index line 40, shown in Figure 2.

It should be noted that with the operator knowing only the date of observation, he sets the sighting slide 27 at this date on the declination arc 23, and the base 10 is on a level support, it is possible to establish the latitude of the place of the observation, and to measure the sun's time at that location. This is done by making observations every twenty minutes of time, which also represents 5° movement of sun—westward. Each time the sun spot is cast on the world globe 24, the observer will note that a new latitude setting must be made and the north arrow 20 must be moved from its previous position. After continuing this procedure every twenty minutes, the observer will note that the changes in latitude and the position of the north arrow 20 become less each time, until finally no change is necessary, and the sun spot will be cast on the world globe for the remaining portion of the day. The instrument then matches the sun's curve for that geographic location for that day.

The present invention is an adaptation and modification of the structures shown in my previous patents, and is constructed to provide a mechanical device to facilitate teaching of geography and astronomy, and to permit a student to visualize the position of celestial bodies relative to his position, or a selected position upon the earth as simulated on the globe 24.

Having described the invention, what I claim as new is:

1. An instrument for teaching geography and astronomy comprising a base, a clamp carried thereby, a latitude arc carried by said clamp and adjustable circumferentially therethrough, a shaft extending diametrically across said latitude arc and having its ends fixed to said latitude arc, a declination arc mounted for rotation on said shaft and mounted within said latitude arc, a sun-time ring journaled on said shaft and fixed to and above said declination arc, a sighting slide slidable circumferentially upon said declination arc, a world globe rotatable on said shaft and movable within said declination arc, and said sighting slide having an aperture through which a ray of light from a celestial body may be cast upon said globe to designate a selected geographical location at a selected time relative to an observed celestial body, and a level indicating means carried by said base for facilitating an accurate measuring of a ray of light at a selected time upon a selected geographical location.

2. An instrument for teaching geography and astronomy comprising a base, a clamp carried thereby, a latitude arc carried by said clamp and adjustable circumferentially therethrough, a shaft extending diametrically across said latitude arc and having its ends fixed to said latitude arc, a declination arc mounted for rotation on said shaft and mounted for rotation relative to said latitude arc, a sun-time ring journaled on said shaft and fixed to and above said declination arc, sighting slides slidable circumferentially upon opposite sides of said declination arc, a world globe rotatable on said shaft and movable within said declination arc, each sighting slide having an aperture through which a ray of light from a celestial body may be cast upon said globe to designate a selected geographical location at a selected time relative to an observed celestial body, and a level indicating means carried by said base for facilitating an accurate measuring of the angle of a ray of light cast at a selected time upon a selected geographical location.

References Cited in the file of this patent
UNITED STATES PATENTS

| | | |
|---|---|---|
| 2,403,920 | Hagner | July 16, 1946 |
| 2,754,597 | Sylvester | July 17, 1956 |